(12) United States Patent
Izumi et al.

(10) Patent No.: US 12,100,559 B2
(45) Date of Patent: Sep. 24, 2024

(54) MULTILAYER ELECTRONIC COMPONENT

(71) Applicant: Murata Manufacturing Co., Ltd., Nagaokakyo (JP)

(72) Inventors: Tatsuya Izumi, Nagaokakyo (JP); Tomotaka Hirata, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 18/328,258

(22) Filed: Jun. 2, 2023

(65) Prior Publication Data

US 2023/0307187 A1  Sep. 28, 2023

Related U.S. Application Data

(62) Division of application No. 16/987,684, filed on Aug. 7, 2020, now Pat. No. 11,710,600.

(30) Foreign Application Priority Data

Aug. 28, 2019  (JP) .................................. 2019-155182

(51) Int. Cl.
*H01G 4/30* (2006.01)
*C04B 35/057* (2006.01)
(Continued)

(52) U.S. Cl.
CPC ............. *H01G 4/30* (2013.01); *C04B 35/057* (2013.01); *H01G 4/008* (2013.01); *H01G 4/012* (2013.01);
(Continued)

(58) Field of Classification Search
CPC .......... H01G 4/30; H01G 4/008; H01G 4/012; H01G 4/1236; C04B 35/057; C04B 2235/3206; C04B 2235/3208
(Continued)

(56) References Cited

U.S. PATENT DOCUMENTS 5,835,339 A  11/1998  Sakamoto et al.
6,396,681 B2  5/2002  Naito
(Continued)

FOREIGN PATENT DOCUMENTS

CN  1774406 A  5/2006
CN  103578757 A  2/2014
(Continued)

OTHER PUBLICATIONS

Chinese Office Action issued for Chinese Application No. 202010853571.5, date of Chinese Office Action Nov. 3, 2021.
(Continued)

*Primary Examiner* — Arun Ramaswamy
(74) *Attorney, Agent, or Firm* — ArentFox Schiff LLP

(57) ABSTRACT

A multilayer electronic component that includes a stacked body having therein a plurality of dielectric layers including a CZ-based perovskite phase and an element M2, a plurality of internal electrode layers including Ni, and an interface layer including the element M2 in at least a portion of an interface with the plurality of internal electrode layers. Element M2 is an element that has a binding energy between the CZ-based perovskite phase and Ni via the element M2 of less than or equal to $-12.3$ eV by first-principles calculation using a pseudopotential method. When amounts of elements included in the dielectric layers are expressed as parts by mol, a ratio m2 of an amount of the element M2 to an amount of the Zr in the interface layer is $0.03 \leq m2 \leq 0.25$.

8 Claims, 2 Drawing Sheets

(51) Int. Cl.
*H01G 4/008* (2006.01)
*H01G 4/012* (2006.01)
*H01G 4/12* (2006.01)

(52) U.S. Cl.
CPC ... *H01G 4/1236* (2013.01); *C04B 2235/3206* (2013.01); *C04B 2235/3208* (2013.01)

(58) Field of Classification Search
USPC .................. 361/301.4, 321.4, 321.1, 303
See application file for complete search history.

(56) References Cited

U.S. PATENT DOCUMENTS

| | | | |
|---|---|---|---|
| 2001/0040784 A1 | 11/2001 | Naito | |
| 2005/0152095 A1* | 7/2005 | Nakano | H01G 4/1227 361/321.4 |
| 2006/0234854 A1 | 10/2006 | Watanabe et al. | |
| 2007/0009719 A1 | 1/2007 | Naito et al. | |
| 2013/0201602 A1 | 8/2013 | Takeoka | |
| 2013/0258551 A1* | 10/2013 | Kim | H01G 4/12 977/773 |
| 2014/0043722 A1 | 2/2014 | Hirata et al. | |
| 2016/0358712 A1* | 12/2016 | Doi | H01G 4/30 |
| 2019/0189346 A1 | 6/2019 | Koga et al. | |

FOREIGN PATENT DOCUMENTS

| | | |
|---|---|---|
| JP | H113834 A | 1/1999 |
| JP | 2001351828 A | 12/2001 |
| JP | 2002270458 A | 9/2002 |
| JP | 2014036140 A | 2/2014 |
| JP | 2019036708 A | 3/2019 |
| JP | 2019114583 A | 7/2019 |
| WO | 2012043427 A1 | 4/2012 |

OTHER PUBLICATIONS

Korean Office Action issued for corresponding KR Patent Application No. 10-2020-0100854, date of Korean Office Action Mar. 7, 2022.

Japanese Office Action issued for corresponding JP Patent Application No. 2019-155182, date of Japanese Office Action Apr. 5, 2022.

* cited by examiner

- ■ NO DELAMINATION
- DELAMINATION
- (DIFFERENT PATTERNS REPRESENT DIFFERENT DEPTHS OF LOCATIONS WHERE DELAMINATION OCCURRED FROM UPPER SURFACE)

SCHEMATIC DIAGRAM OF TEM OBSERVED IMAGE

SCHEMATIC DIAGRAM OF TEM OBSERVED IMAGE

MULTILAYER ELECTRONIC COMPONENT

CROSS REFERENCE TO RELATED APPLICATIONS

The present application is a divisional of application Ser. No. 16/987,684, filed Aug. 7, 2020, which claims priority to Japanese Patent Application No. 2019-155182, filed Aug. 28, 2019, the entire contents of which are incorporated herein by reference.

BACKGROUND OF THE INVENTION

Field of the Invention

The present disclosure relates to a multilayer electronic component.

Description of the Background Art

Examples of a multilayer electronic component include a multilayer ceramic capacitor. In a temperature-compensating multilayer ceramic capacitor, a $CaZrO_3$-based (hereinafter also abbreviated as "CZ-based") dielectric material may be used for a dielectric layer. The term "CZ-based," as used herein, refers to a material system including not only $CaZrO_3$, but also a $CaZrO_3$ solid solution in which an appropriate element substitutes for a portion of the Ca, a portion of the Zr, or a portion of each of the Ca and the Zr.

Japanese Patent Laying-Open No. 2001-351828, for example, discloses a multilayer ceramic capacitor including a dielectric layer in which a CZ-based dielectric material is used. The CZ-based dielectric material described in Japanese Patent Laying-Open No. 2001-351828 is mainly composed of a CZ-based perovskite compound, with Al, Si, Mn and the like as sub-components.

SUMMARY OF THE INVENTION

The CZ-based dielectric material disclosed in Japanese Patent Laying-Open No. 2001-351828 provides strengthened binding between grain boundaries in the dielectric layer because of the above-described sub-components, and can be rendered chemically stable, thereby suppressing degradation in insulation resistance in reliability testing under high temperature and high humidity. The chemical stability of the dielectric material, however, may result in a reduced binding force between the dielectric layer and an internal electrode layer.

An object of the present disclosure is to provide a multilayer electronic component capable of improving a binding force between a dielectric layer in which a CZ-based dielectric material is used and an internal electrode layer.

A first mode of a multilayer electronic component according to the present disclosure includes a stacked body having therein a plurality of dielectric layers including a $CaZrO_3$-based perovskite phase and an element M1, a plurality of internal electrode layers including Cu, and an interface layer including the element M1 in at least a portion of an interface with the plurality of internal electrode layers. Element M1 is an element that has a binding energy between $CaZrO_3$ and Cu via the element M1 of less than or equal to $-9.8$ eV by first-principles calculation using a pseudopotential method. When amounts of elements included in the dielectric layers are expressed as parts by mol, a ratio m1 of an amount of the element M1 to an amount of the Zr in the interface layer is $0.03 \leq m1 \leq 0.25$.

A second mode of the multilayer electronic component according to the present disclosure includes a stacked body having therein a plurality of dielectric layers including a $CaZrO_3$-based perovskite phase and an element M2, a plurality of internal electrode layers including Ni, and an interface layer including the element M1 in at least a portion of an interface with the plurality of internal electrode layers. Element M2 is an element that has a binding energy between $CaZrO_3$ and Ni via the element M2 of less than or equal to $-12.3$ eV by first-principles calculation using a pseudopotential method. When amounts of elements included in the dielectric layers are expressed as parts by mol, a ratio m2 of an amount of the element M2 to an amount of the Zr in the interface layer is $0.03 \leq m2 \leq 0.25$.

The multilayer electronic component according to the present disclosure can improve a binding force between a dielectric layer in which a CZ-based dielectric material is used and an internal electrode layer.

DETAILED DESCRIPTION OF THE PREFERRED EMBODIMENTS

Figure 1:
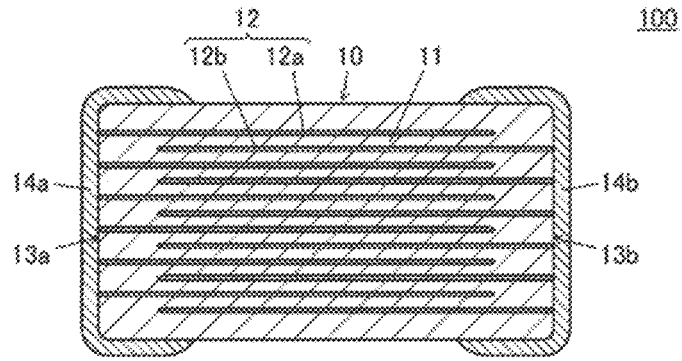
FIG. 1 is a sectional view of a multilayer ceramic capacitor 100 which is a first embodiment of a multilayer electronic component according to the present disclosure.

Characteristics of the present disclosure will be described with reference to the drawings. It should be noted that in each embodiment of a multilayer electronic component described below, the same or common portions are designated by the same reference characters in the drawings and may not be described repeatedly.

First Embodiment of Multilayer Electronic Component

A multilayer ceramic capacitor 100 illustrating a first embodiment of a multilayer electronic component according to the present disclosure is described using FIGS. 1 to 4.

<Structure of Multilayer Ceramic Capacitor>

A structure of multilayer ceramic capacitor 100 is described below. FIG. 1 is a sectional view of multilayer ceramic capacitor 100. Multilayer ceramic capacitor 100 includes a stacked body 10. Stacked body 10 includes a plurality of stacked dielectric layers 11 and a plurality of stacked internal electrode layers 12.

Stacked body 10 has a first main surface and a second main surface opposed to each other in a stacking direction, a first side surface and a second side surface opposed to each other in a width direction orthogonal to the stacking direction, and a first end surface 13a and a second end surface 13b opposed to each other in a length direction orthogonal to the stacking direction and the width direction. Stacked body 10 has a rectangular parallelepiped shape enclosed with the above-described surfaces. Corner portions and ridge portions of the rectangular parallelepiped may be rounded by barreling or the like.

The plurality of dielectric layers 11 include dielectric layers forming outer layer portions and dielectric layers forming an inner layer portion. The outer layer portions are disposed between the first main surface of stacked body 10 and internal electrode layer 12 closest to the first main surface, and between the second main surface and internal electrode layer 12 closest to the second main surface. The inner layer portion is disposed in a region sandwiched between those two outer layer portions.

Dielectric layer 11 includes a CZ-based perovskite phase. As was mentioned earlier, the term "CZ-based" refers to a material system including not only $CaZrO_3$, but also a $CaZrO_3$ solid solution in which an appropriate element substitutes for a portion of the Ca, a portion of the Zr, or a portion of each of the Ca and the Zr. Examples of an element that can substitute for a portion of the Ca include Ba, Sr and Mg. Examples of an element that can substitute for a portion of the Zr include Hf, Ti, Mn and Sn. A ratio of the amount of an element present at a Ca site to the amount of an element present at a Zr site may be other than one.

Dielectric layer 11 further includes an element M1. It should be noted that element M1 is an element that has a binding energy between CZ and Cu via element M1 of less than or equal to $-9.8$ eV by first-principles calculation using a pseudopotential method. This element M1 will be described later in detail.

The plurality of internal electrode layers 12 include first internal electrode layers 12a and second internal electrode layers 12b. First internal electrode layers 12a includes a facing electrode portion facing second internal electrode layers 12b with dielectric layer 11 interposed therebetween, and an extracted electrode portion from the facing electrode portion to first end surface 13a of stacked body 10. Second internal electrode layers 12b includes a facing electrode portion facing first internal electrode layers 12a with dielectric layer 11 interposed therebetween, and an extracted electrode portion from the facing electrode portion to second end surface 13b of stacked body 10.

One first internal electrode layer 12a and one second internal electrode layer 12b oppose each other with dielectric layer 11 interposed therebetween to form one capacitor device. It can be said that multilayer ceramic capacitor 100 corresponds to a plurality of capacitors connected in parallel via a first external electrode 14a and a second external electrode 14b which will be described later.

Internal electrode layers 12 include Cu. Internal electrode layers 12 may further include dielectric particles. The above-described dielectric particles are added during firing of stacked body 10 in order to provide internal electrode layers 12 with a sintering contraction characteristic close to that of dielectric layers 11. Any dielectric particles may be used so long as such an effect is produced.

Multilayer ceramic capacitor 100 further includes first external electrode 14a and second external electrode 14b. First external electrode 14a is formed on first end surface 13a of stacked body 10 so as to be electrically connected to first internal electrode layers 12a, and extends from first end surface 13a to the first main surface and the second main surface as well as the first side surface and the second side surface. Second external electrode 14b is formed on second end surface 13b of stacked body 10 so as to be electrically connected to second internal electrode layers 12b, and extends from second end surface 13b to the first main surface and the second main surface as well as the first side surface and the second side surface.

First external electrode 14a and second external electrode 14b include a base electrode layer, and a plated layer disposed on the base electrode layer. The base electrode layer includes at least one selected from a sintered body layer, a conductive resin layer, a metal thin film layer, and a plated layer.

The sintered body layer is obtained by baking a paste including metal powders and glass powders, and includes a conductor region and an oxide region. The conductor region includes a metal sintered body obtained by sintering of the above-described metal powders. As the metal powders, at least one type of metal selected from Ni, Cu, Ag and the like, or an alloy including this metal can be used. The oxide region includes a glass component derived from the above-described glass powders. As the glass powders, a $B_2O_3$—$SiO_2$—BaO-based glass material or the like can be used.

A plurality of sintered body layers having different components may be formed. The sintered body layer may be fired simultaneously with stacked body 10, or may be baked after stacked body 10 has been fired.

The conductive resin layer includes conductive particles such as metal fine particles, and a resin portion. As a metal forming the conductive particles, at least one type of metal selected from Ni, Cu, Ag and the like, or an alloy including this metal can be used. As a resin forming the resin portion, an epoxy-based thermosetting resin or the like can be used. A plurality of conductive resin layers having different components may be formed.

The metal thin film layer is formed by a thin film forming method such as sputtering or vapor deposition, and has a thickness less than or equal to 1 μm, with metal fine particles deposited therein. As a metal forming the metal thin film layer, at least one type of metal selected from Ni, Cu, Ag, Au and the like, or an alloy including this metal can be used. A plurality of metal thin film layers having different components may be formed.

The plated layer as a base electrode is directly provided on stacked body 10, and directly connected to the above-described internal electrode layers. For the plated layer, at least one type of metal selected from Cu, Ni, Sn, Au, Ag, Pd, Zn and the like, or an alloy including this metal can be used. When Cu is used as a metal forming internal electrode layers 12, for example, it is preferable to use Cu, which has excellent bondability with internal electrode layers 12, as the plated layer.

As a metal forming the plated layer disposed on the base electrode layer, at least one type of metal selected from Ni, Cu, Ag, Au, Sn and the like, or an alloy including this metal can be used. A plurality of plated layers having different components may be formed. Preferably, two plated layers, namely, a Ni plated layer and a Sn plated layer, are formed.

The Ni plated layer is disposed on the base electrode layer, and can prevent erosion of the base electrode layer by solder during mounting of the multilayer electronic component. The Sn plated layer is disposed on the Ni plated layer. The Sn plated layer has excellent wettability with solder including Sn, thereby improving the mountability during mounting of the multilayer electronic component. These plated layers are not essential.

<Microstructure of Dielectric Layer>

Dielectric layers 11 of multilayer ceramic capacitor 100 according to the present disclosure includes the CZ-based perovskite phase, and further includes element M1, as described above. It should be noted that element M1 is an element that has a binding energy between CZ and Cu via the element M1 of less than or equal to −9.8 eV by first-principles calculation using a pseudopotential method. This element M1 is described below.

The term "first-principles calculation using a pseudopotential method," as used herein, refers to a method of performing first-principles calculation using a plane-wave basis, by replacing inner-shell electrons in the vicinity of an atomic nucleus by simple potential functions with respect to valence electrons, instead of by directly treating the inner-shell electrons. In the present first-principles calculation, the inner-shell electrons are replaced by generalized gradient approximation (GGA)-type pseudopotentials.

To calculate a binding energy between CZ and Cu by the first-principles calculation using a pseudopotential method, model structures of an interface between CZ and Cu were set. The set model structures were a first model structure formed of a CZ layer and a Cu layer, and a second model structure in which Mn was present between a CZ layer and a Cu layer.

Binding energy $E_{bin}$, between CZ and Cu calculated based on the first model structure was −9.10 eV. Binding energy $E_{bin}$, between CZ and Cu via Mn calculated based on the second model structure was −12.49 eV. Further, based on the second model structures in which Al, Si, Ti and V were used as element M1, binding energies $E_{bin}$, between CZ and Cu via the element M1 were calculated. The results thereof are collectively shown in Table 1:

TABLE 1

Calculation results of binding energy between CZ and Cu by first-principles calculation

| | CZ/Cu | CZ/Al/Cu | CZ/Si/Cu | CZ/Mn/Cu | CZ/Ti/Cu | CZ/V/Cu |
|---|---|---|---|---|---|---|
| $E_{bin}$ (eV) | −9.10 | −9.89 | −10.71 | −12.49 | −12.76 | −13.19 |

Figure 2A:
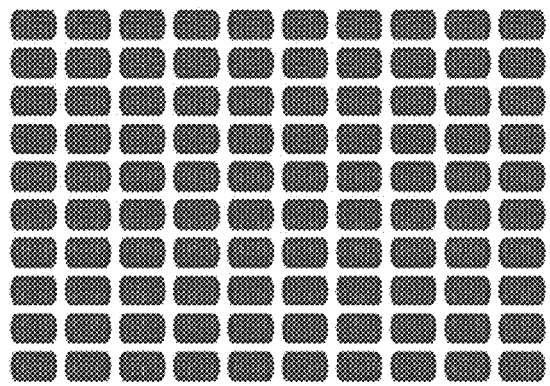
FIG. 2A is a schematic diagram of results of examination of delamination in multilayer ceramic capacitor 100 including a dielectric layer 11 in which an Al-added CZ-based dielectric material was used.
Figure 2B:
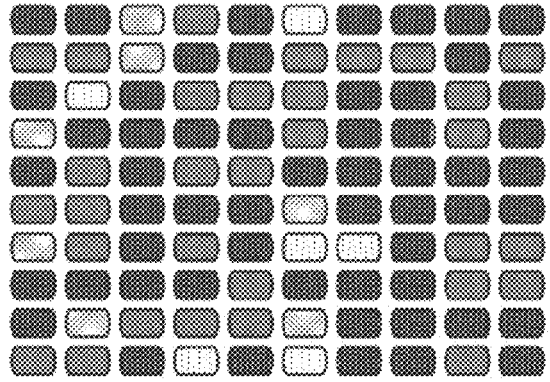
FIG. 2B is a schematic diagram of results of examination of delamination in a multilayer ceramic capacitor including a dielectric layer in which a CZ-based dielectric material to which Al had not been added was used.

FIGS. 2A and 2B show results of examination of delamination in multilayer ceramic capacitors in order to clarify the difference in binding force between the dielectric layer and the internal electrode layer depending on the presence or absence of addition of element M1. FIG. 2A is a schematic diagram of results of examination of delamination in multilayer ceramic capacitor 100 including dielectric layers 11 in which a CZ-based dielectric material to which 1.0 mol % of Al had been added to CZ was used, and internal electrode layers 12 which included Cu. FIG. 2B is a schematic diagram of results of examination of delamination in a multilayer ceramic capacitor including a dielectric layer in which a CZ-based dielectric material to which Al had not been added was used, and an internal electrode layer which similarly included Cu.

The examination of delamination in the multilayer ceramic capacitor was conducted by observation with a constant depth mode scanning acoustic microscope (hereinafter also abbreviated as "C-SAM"). The multilayer ceramic capacitor used in the above-described C-SAM observation had a thickness of 1.2 mm in the stacking direction, a length of 2.0 mm orthogonal to the stacking direction, and a width of 1.2 mm orthogonal to the stacking direction and the length direction.

The C-SAM observation was conducted after the multilayer ceramic capacitor to be observed had been left to stand in saturated pressurized vapor under prescribed conditions.

In addition, the C-SAM observation was conducted by holding the above-described multilayer ceramic capacitor in water, applying an ultrasonic wave of 50 MHz, and constructing an image from a reflected wave thereof. Each image in the C-SAM observation results corresponds to each multilayer ceramic capacitor.

Binding energy $E_{bin}$ between CZ and Cu via Al shown in Table 1 is −9.89 eV. It is assumed that this represents a binding energy between dielectric layers 11 in which an Al-added CZ-based dielectric material was used, and internal electrode layers 12 which included Cu. As shown in FIG. 2A, of the one hundred C-SAM observation results of multilayer ceramic capacitors 100 in which an Al-added CZ-based dielectric material was used, there was none in which delamination was found inside.

Of the one hundred C-SAM observation results of multilayer ceramic capacitors 100 in which a CZ-based dielectric material to which Si, Mn, Ti and V had been added as element M1 was used, too, there was none in which delamination was found inside. It should be noted that 1.0 mol % of each of Si, Mn, Ti and V was added to CZ, in a manner similar to Al.

Binding energy $E_{bin}$ between CZ and Cu without the addition of element M1, on the other hand, is −9.10 eV. It is assumed that this represents a binding energy between the dielectric layers in which a CZ-based dielectric material to which element M1 had not been added was used, and the internal electrode layer which included Cu. As shown in FIG. 2B, of the one hundred C-SAM observation results of the multilayer ceramic capacitors in which a CZ-based dielectric material to which element M1 had not been added was used, there were 47 in which delamination was found inside.

Different patterns in the C-SAM observation results represent different depths, from the upper surface, of locations in the multilayer ceramic capacitor where the delamination occurred between the dielectric layer and the internal electrode layer. The delamination between the dielectric layer and the internal electrode layer occurred entirely over a certain length in some cases, and occurred partially in other cases. Both cases were counted as the occurrences of delamination. The above-described results are collectively shown in Table 2:

TABLE 2

Difference in C-SAM observation results of multilayer ceramic capacitors depending on presence or absence of addition of element M

| | Not added | Al-added | Si-added | Mn-added | Ti-added | V-added |
|---|---|---|---|---|---|---|
| Number of occurrences of delamination out of 100 | 47 | 0 | 0 | 0 | 0 | 0 |

Namely, since dielectric layer 11 includes such element M1 that a binding energy between CZ and Cu via this element is less than or equal to −9.8 eV in the above-described first-principles calculation, the binding force between dielectric layer 11 and internal electrode layer 12 can be improved. The binding force between CZ and Cu increases as the value of binding energy $E_{bin}$, decreases. Accordingly, it is more preferable for element M1 to be an element where the binding energy between the CZ and the Cu via this element M1 is less than −12.0 eV, such as Mn, Ti and V.

To examine a microstructure of dielectric layer 11, TEM observation and EDX elemental analysis were conducted. In this examination, a CZ-based dielectric material in which 3.0 mol % of Mn had been added to CZ was used for dielectric layers 11. In addition, Cu was used for internal electrode layers 12.

Figure 3:
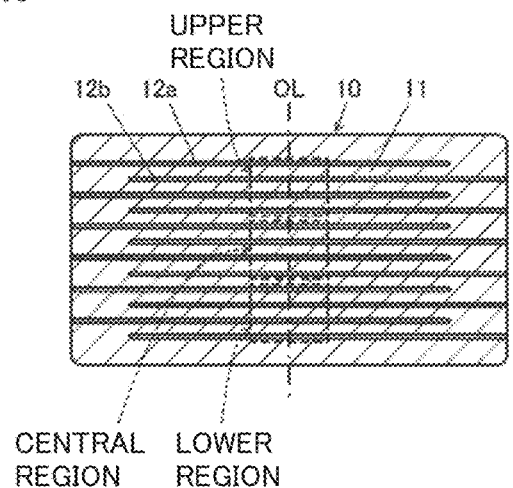
FIG. 3 is a sectional view of a sample prepared to examine a microstructure of dielectric layer 11.

Preparation of samples for the TEM observation and the EDX analysis is described using FIG. 3. FIG. 3 is a sectional view of a sample prepared to examine the microstructure of dielectric layer 11 of multilayer ceramic capacitor 100.

Stacked body 10 of multilayer ceramic capacitor 100 was obtained by a manufacturing method which will be described later. Stacked body 10 was polished from the first side surface side and the second side surface side so as to leave a central portion of stacked body 10 in the width direction, and accordingly a polished body was obtained. As shown in FIG. 3, an imaginary line OL was assumed to be orthogonal to internal electrode layers 12 in the vicinity of a central portion in the length direction. Then, a region having dielectric layers 11, first internal electrode layers 12a and second internal electrode layers 12b stacked therein for obtaining a capacitance of the polished body was equally divided in the stacking direction along imaginary line OL into three regions that are an upper region, a central region and a lower region.

The upper region, the central region and the lower region were cut out from the polished body and were thinned by Ar ion milling or the like, and accordingly three thin film samples were obtained from each region. For the three thin film samples obtained from each of the upper region, the central region and the lower region of stacked body 10 in this manner, TEM observation and EDX elemental analysis accompanied with the TEM were conducted.

In TEM observation results and EDX analysis results which will be described later, no significant difference was found between the central region and each of the upper and lower regions. Therefore, a result obtained from the central region described below is regarded as the microstructure of dielectric layer 11 of multilayer ceramic capacitor 100 according to the present disclosure.

Dielectric layer 11 had a thickness of 3 μm, and crystal grains of the dielectric material had an average grain size of 0.2 μm, which was determined as an average value of equivalent circle diameters by image analysis (the crystal grains are not shown). Grain boundaries of the crystal grains were visually determined from a TEM observed image.

Figure 4:
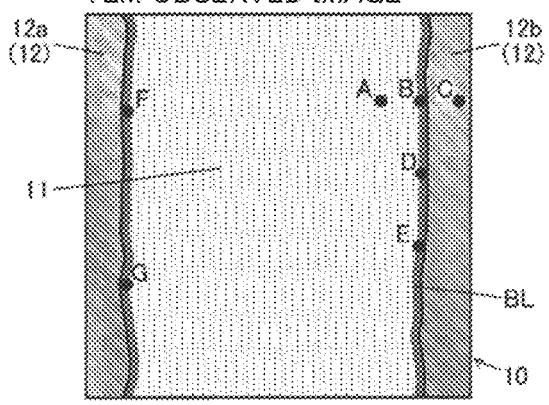
FIG. 4 is a schematic diagram of an observed image of dielectric layer 11 from a transmission electron microscope (hereinafter also abbreviated as "TEM").

FIG. 4 is a schematic diagram of a TEM observed image of dielectric layer 11 in the central region in FIG. 3. From TEM observation and EDX elemental analysis, it was found that dielectric layer 11 of multilayer ceramic capacitor 100 had an interface layer BL including element M1 at an interface with internal electrode layers 12a and 12b. Interface layer BL was presumably formed by Mn that had dissolved in a solid state in the vicinity of grain boundaries of the crystal grains of the CZ-based dielectric material in contact with internal electrode layers 12a and 12b. Interface layer BL may include an element dissolved in a solid state in addition to Mn. In addition, at least a portion of interface layer BL may not have a perovskite structure.

Results of examination by EDX analysis of a variation in the amount of Mn due to different analysis positions A to G in dielectric layer 11 shown in FIG. 4 are collectively shown in Table 3. The amount of Mn in dielectric layer 11 is expressed as a ratio m1 of the amount of Mn to the amount of Zr, when the amounts of elements included in dielectric layer 11 are expressed as parts by mol:

TABLE 3

Variation in amount of Mn due to different analysis positions in dielectric layer examined by EDX analysis

| | Analysis position | | | | | | |
|---|---|---|---|---|---|---|---|
| | A | B | C | D | E | F | G |
| m: Mn/Zr | 0.013 | 0.140 | Not detected | 0.225 | 0.127 | 0.245 | 0.035 |

Namely, in multilayer ceramic capacitor 100 according to the present disclosure, when the amounts of elements included in dielectric layer 11 are expressed as parts by mol, a ratio m1 of the amount of Mn to the amount of the Zr in the interface layer BL is $0.03 \leq m1 \leq 0.25$. In this case, as described above, the binding energy between the CZ and the Cu decreases via the Mn, so that the binding force between dielectric layer 11 and internal electrode layer 12 can be improved.

Interface layer BL is preferably present on the entire interface between dielectric layer 11 and internal electrode layer 12, as shown in FIG. 4. However, interface layer BL is only required to be present in at least a portion of the interface between dielectric layer 11 and internal electrode layer 12.

Although the above-described EDX analysis was conducted for dielectric layer 11 including Mn as element M1, in each element M1 described above, the ratio m1 of the amount of element M1 to the amount of Zr in interface layer BL is defined as the above-described range.

Similarly, to calculate a binding energy between CZ and Ni by the first-principles calculation using a pseudopotential method, model structures of an interface between the CZ and the Ni were set. The set model structures were a third model structure formed of a CZ layer and a Ni layer, and fourth model structures in which Al, Si, Mn, Ti, V were present as an element M2 between a CZ layer and a Ni layer. The results of calculation of binding energies $E_{bin}$, between the CZ and the Ni and between the CZ and the Ni via the element M2 based on those model structures are collectively shown in Table 4:

TABLE 4

Calculation results of binding energy between CZ and Ni by first-principles calculation

| | CZ/Ni | CZ/Al/Ni | CZ/Si/Ni | CZ/Mn/Ni | CZ/Ti/Ni | CZ/V/Ni |
|---|---|---|---|---|---|---|
| $E_{bin}$ (eV) | −12.26 | −12.45 | −13.05 | −13.78 | −14.17 | −14.39 |

As shown in Table 4, binding energy $E_{bin}$, between CZ and Ni calculated based on the third model structure is −12.26 eV. It is assumed that this represents a binding energy between the dielectric layer in which a CZ-based dielectric material was used, and the internal electrode layer which included Ni. Binding energies $E_{bin}$, between CZ and Ni via the above-described elements, on the other hand, are all less than −12.3 eV.

Accordingly, when the internal electrode layer includes Ni, the addition of element M2 to the CZ-based dielectric material makes the binding between dielectric layer 11 and internal electrode layer 12 stronger than when element M2 is not added to the dielectric material. Of the one hundred C-SAM observation results of multilayer ceramic capacitors 100 in which a CZ-based dielectric material to which element M2 had been added was used, there was none in which delamination was found inside.

Namely, since dielectric layer 11 includes such element M2 that a binding energy between CZ and Ni via this element is less than or equal to −12.3 eV in the above-described first-principles calculation, the binding force between dielectric layer 11 and internal electrode layer 12 can be improved. The binding force between CZ and Ni increases as the value of binding energy $E_{bin}$ decreases. Accordingly, it is more preferable for element M2 to be such an element that the binding energy between CZ and Ni via this element is less than −13.5 eV, such as Mn, Ti and V.

In addition, from TEM observation and EDX elemental analysis, it was found that, when the internal electrode layer was Ni, a dielectric layer 11 including a CZ-based dielectric material to which element M2 had been added had interface layer BL including element M2 at the interface with internal electrode layer 12. When the amounts of elements included in dielectric layer 11 are expressed as parts by mol, a ratio m2 of the amount of element M2 to the amount of Zr in the interface layer BL is 0.03≤m2≤0.25. In this case, the binding energy between CZ and Ni decreases via element M2, so that the binding force between dielectric layer 11 and internal electrode layer 12 can be improved.

Second Embodiment of Multilayer Electronic Component

Figure 5:
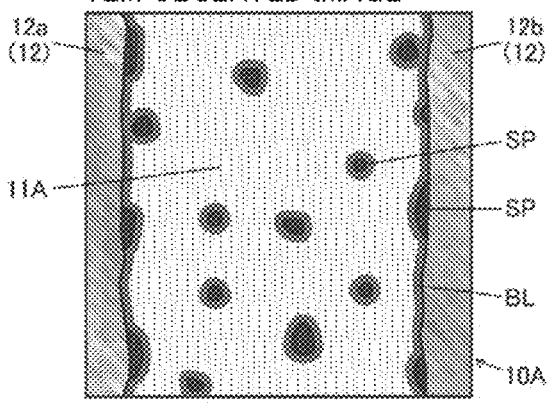
FIG. 5 is a schematic diagram of a TEM observed image of a dielectric layer 11A included in a multilayer ceramic capacitor 100A which is a second embodiment of the multilayer electronic component according to the present disclosure.

A multilayer ceramic capacitor 100A illustrating a second embodiment of the multilayer electronic component according to the present disclosure is described using FIG. 5. Multilayer ceramic capacitor 100A includes a stacked body 10A. The other components are similar to those of multilayer ceramic capacitor 100, and are thus not described. A macroscopic structure of multilayer ceramic capacitor 100A is similar to that of multilayer ceramic capacitor 100, and is thus not illustrated (see FIG. 1).

FIG. 5 is a schematic diagram of a TEM observed image of a dielectric layer 11A included in multilayer ceramic capacitor 100A. Stacked body 10A in multilayer ceramic capacitor 100A includes the plurality of stacked dielectric layers 11A and the plurality of stacked internal electrode layers 12. Dielectric layer 11A includes a CZ-based perovskite phase, and further includes above-described element M1. Internal electrode layer 12 includes Cu.

Dielectric layer 11A in stacked body 10A has interface layer BL including element M1 at the interface with internal electrode layer 12, as in the first embodiment. Dielectric layer 11A, on the other hand, further has a secondary phase SP including above-described element M1. Secondary phase SP is at least partially included in interface layer BL. Namely, in the second embodiment, a combination of a simple film-like interface layer as described in the first embodiment and secondary phase SP is referred to as interface layer BL.

Secondary phase SP is different from the CZ-based perovskite phase, and includes an oxide of element M1, a compound of element M1 and other elements forming dielectric layer 11A, and the like. The existence of such a secondary phase at the interface between dielectric layer 11A and internal electrode layer 12 means that element M1 is sufficiently present, within the above-described amount range, over a wide area of the interface between dielectric layer 11A and internal electrode layer 12. Therefore, multilayer ceramic capacitor 100A can further improve the binding force between dielectric layer 11A and internal electrode layer 12.

When dielectric layer 11A includes above-described element M2 and internal electrode layer 12 includes Ni, since secondary phase SP including element M2 is included in interface layer BL, the binding force between dielectric layer 11A and internal electrode layer 12 can be further improved.

Method of Manufacturing Multilayer Electronic Component

A method of manufacturing multilayer ceramic capacitor 100 illustrating the embodiment of the multilayer electronic component according to the present disclosure is described in the order of manufacturing steps. The method of manufacturing multilayer ceramic capacitor 100 includes the following steps. Each reference sign used in the following corresponds to that shown in FIG. 1.

The method of manufacturing multilayer ceramic capacitor 100 includes a step of obtaining a plurality of ceramic green sheets using dielectric powders (dielectric raw material powders) including elements forming a CZ-based perovskite phase, and element M1. The dielectric raw material powders may include various additives as needed. The term "green" is an expression indicating "unsintered," and will be used to mean as such hereinafter. Namely, the ceramic green sheets correspond to an unsintered dielectric layer. The ceramic green sheets include a binder component in addition to the dielectric raw material powders. The binder component is not particularly limited.

The above-described dielectric raw material powders are made by calcination of a compound of the elements forming the CZ-based perovskite phase, and a compound of element M1, after the compounds have been mixed together. Alternatively, the dielectric raw material powders may be made by calcination of CZ-based perovskite phase powders produced in advance, and a compound of element M1, after the powders and the compound have been mixed together. Further, when using the CZ-based perovskite phase powders produced in advance, a subsequent calcination step may not be provided. The CZ-based perovskite phase powders can be obtained by a solid-phase synthesis method, a liquid phase method and the like.

The method of manufacturing multilayer ceramic capacitor 100 includes a step of forming an internal electrode layer pattern on the ceramic green sheet by printing a paste for internal electrode layer, for example. The internal electrode layer pattern corresponds to an unsintered internal electrode layer. The paste for internal electrode layer includes metal powders including Cu, dielectric particles, and a binder component.

As was mentioned earlier, the above-described dielectric particles are added during firing of stacked body 10 in order to provide internal electrode layer 12 with a sintering contraction characteristic close to that of dielectric layer 11. Any dielectric particles may be used so long as such an effect is produced. Namely, the dielectric particles may be the same as or different from the dielectric raw material powders. The dielectric particles are not essential. The binder component is not particularly limited, either. The internal electrode layer pattern may be formed by a method other than the above-described printing of the paste for internal electrode.

The method of manufacturing multilayer ceramic capacitor 100 includes a step of obtaining a green stacked body by stacking the plurality of ceramic green sheets including the ceramic green sheet having the internal electrode pattern formed thereon. The green stacked body corresponds to an unsintered stacked body.

The method of manufacturing multilayer ceramic capacitor 100 includes a step of sintering the green stacked body, to obtain stacked body 10 including the plurality of stacked dielectric layers 11 and the plurality of stacked internal electrode layers 12.

In the step of obtaining the plurality of ceramic green sheets in the method of manufacturing multilayer ceramic capacitor 100, dielectric powders (dielectric raw material powders) including the elements forming the CZ-based perovskite phase and element M2 may be used. In that case, in the step of forming the internal electrode layer pattern on the ceramic green sheet, a paste for internal electrode layer including metal powders including Ni, dielectric particles, and a binder component is used.

The embodiments disclosed in this specification are illustrative, and the invention according to the present disclosure is not limited to the embodiments. Namely, the scope of the invention according to the present disclosure is defined by the terms of the claims, and is intended to include any modifications within the meaning and scope equivalent to the terms of the claims. Moreover, a variety of applications or variations are possible within the scope described above.

For example, a variety of applications or variations are possible within the scope of the present invention, in terms of the number and the material of the dielectric layers as well as the number and the material of the internal electrode layers that form the stacked body. Moreover, although a multilayer ceramic capacitor has been illustrated as the multilayer electronic component, the invention according to the present disclosure is not limited thereto, and is also applicable to a capacitor device or the like formed in a multilayer substrate.

What is claimed is:

1. A multilayer electronic component comprising:
a stacked body having therein a plurality of dielectric layers including a $CaZrO_3$-based perovskite phase and an element M2, a plurality of internal electrode layers including Ni, and an interface layer including the element M2 in a solid state dissolved form in a in a vicinity of grain boundaries of crystal grains of the $CaZrO_3$-based perovskite phase in contact with the plurality of internal electrode layers, wherein the element M2 is an element having a binding energy between $CaZrO_3$ and Ni via the element M2 of less than or equal to $-12.3$ eV by first-principles calculation using a pseudopotential method, and when amounts of elements included in the plurality of dielectric layers are expressed as parts by mol, a ratio m2 of an amount of the element M2 to an amount of the Zr in the interface layer is $0.03 \leq m2 \leq 0.25$, and the interface layer contains more of the element M2 than the plurality of dielectric layers.

2. The multilayer electronic component according to claim 1, wherein the element M2 is at least one element selected from Al, Si, Mn, Ti and V.

3. The multilayer electronic component according to claim 2, wherein
the plurality of dielectric layers further include a secondary phase including the element M2, and
the secondary phase is at least partially included in the interface layer.

4. The multilayer electronic component according to claim 1, wherein
the plurality of dielectric layers further include a secondary phase including the element M2, and
the secondary phase is at least partially included in the interface layer.

5. The multilayer electronic component according to claim 1, wherein the binding energy between the $CaZrO_3$ and the Ni via the element M2 is less than $-13.5$ eV by the first-principles calculation using the pseudopotential method.

6. The multilayer electronic component according to claim 5, wherein the element M2 is selected from Mn, Ti and V.

7. The multilayer electronic component according to claim 6, wherein
the plurality of dielectric layers further include a secondary phase including the element M2, and
the secondary phase is at least partially included in the interface layer.

8. The multilayer electronic component according to claim 5, wherein
the plurality of dielectric layers further include a secondary phase including the element M2, and
the secondary phase is at least partially included in the interface layer.

* * * * *